United States Patent [19]

Schumacher

[11] 4,124,284
[45] Nov. 7, 1978

[54] MULTIPLE IMAGE PROJECTION DEVICE

[75] Inventor: Erick Schumacher, Sepulveda, Calif.

[73] Assignee: Industrial Electronic Engineers, Inc., Van Nuys, Calif.

[21] Appl. No.: 727,029

[22] Filed: Sep. 27, 1976

[51] Int. Cl.² ............................................. G03B 23/10
[52] U.S. Cl. ....................................... 353/25; 353/108
[58] Field of Search ................... 353/25, 26 A, 26 R, 353/27 A, 27 R, 107–110

[56] References Cited

U.S. PATENT DOCUMENTS

| 1,166,384 | 12/1915 | Partridge et al. | 353/108 |
| 3,296,727 | 1/1967 | Liguori | 353/107 |
| 3,704,451 | 11/1972 | Pearson | 353/25 |
| 3,712,723 | 1/1973 | Gerry | 353/120 |
| 3,865,479 | 2/1975 | Frye et al. | 353/110 |

FOREIGN PATENT DOCUMENTS 190,774 12/1966 U.S.S.R. ................................ 353/108

Primary Examiner—Harry N. Haroian
Attorney, Agent, or Firm—Ellsworth R. Roston

[57] ABSTRACT

A projection device for selectively projecting one of a large number of images. A stepper motor operatively positions a selected transparency on a cartridge, containing a plurality of transparencies, within a projection system for illumination and projection of the image from the transparency onto a viewing screen. Apparatus is provided for automatically identifying the transparency cartridge which is being controlled by the stepper motor and for determining a homing position. The stepper motor always returns the cartridge to a starting or home position before moving the number of steps required to locate the selected transparency within the projection system.

23 Claims, 4 Drawing Figures

MULTIPLE IMAGE PROJECTION DEVICE

BACKGROUND OF THE INVENTION

The present invention relates to projection devices by means of which selected images may be projected onto a viewing screen. More particularly, the invention relates to such a device for selecting a transparency, out of a plurality of transparencies arranged in a predetermined sequence, for projecting the image of only the selected transparency onto a viewing screen.

In the past, many devices have been produced by means of which a selected image could be projected onto a viewing screen in order to inform the viewer that, for example, certain actions should be taken, certain machinery conditions existed, etc. Such devices, referred to as "read-outs" employed a negative or transparency having a plurality of images thereon. Such transparencies have been mounted in housings for cooperation with a plurality of projection systems. If 12 images were located on the transparency, for example, a like number of projection systems, including lamps, lens sets, etc., must also be provided within the housing. In order to project the desired image of the transparency onto the viewing screen, it was necessary to select the proper lamp and then deliver power to it for illumination. An example of such a device has been shown in U.S. Pat. No. 3,324,765.

It is quite apparent that, with these prior art devices, the number of images which can be projected onto a viewing screen from a single unit is dependant upon several factors, including the maximum allowable size of the housing containing the transparency, projection systems, etc; the quality of the optics in each projection system; the size of the image of the transparency which is to be projected; the size of the viewing screen; and the desired size and resolution quality of the image projected onto the screen. Further, as the unit is enlarged to allow the projection of additional images, its cost increases in direct proportion because each additional image requires the employment of an additional projection system.

It has also been known in the prior art to provide a single projection system, into which a plurality of transparencies may be moved, for projection of multiple images of the transparencies onto a screen. However, these devices require that the transparencies be moved into the projection system in their arranged sequence, resulting in the projection of each image seriatim. An example of such a device has been shown, for example, in the slide projector and carrier described and illustrated in U.S. Pat. No. 3,324,765.

Prior art devices of this type are satisfactory for use when it is acceptable to align a transparency with a projection system, project its image onto a screen, move the next transparency into alignment, project it onto the screen, and so forth around the carrier until the first slide is again positioned in alignment with the projection system.

However, none of these prior art devices have satisfactorily met the requirement of an inexpensive apparatus for the projection of a single image, specifically selected from a seriation of transparencies. In other words, it has become desirable and necessary to provide an apparatus having a single projection system which may be utilized in combination with a large number of transparencies, which allows projection of any selected transparency without having to work through the series of transparencies.

SUMMARY OF THE INVENTION

The present invention relates to a device which accomplishes the desired functions at high speed and low cost. In its presently preferred embodiment, the invention may employ a motor which can be operated through discrete fractions of movement about its axis. Such a motor might, for example, be a stepper motor, a synchronous motor, or some other type of device so long as it can be controlled through a precise movement equivalent to a predetermined fraction of 360°. For example, if it is desired that the system be capable of displaying 100 different images, it is necessary that the motor system be precisely controllable in 3.6° increments, or less. It is thus apparent that one of the parameters with which a designer must be concerned when employing the present invention is the number of distinct images which it may be necessary to project, since that parameter will control, to some extent, the motor and the drive system which are employed.

In the preferred embodiment, the motor turns a carrier upon which a cartridge may be removably mounted. The cartridge may be of any desired configuration, including a flat disk, conical, cylindrical, etc. In any event, the transparencies bearing the images which are to be projected are mounted on the cartridge in such a manner as to be alignable within a projection system by the carrier. Thus, only a single projection system, including a lamp and a lens set, need be employed in a device utilizing the present invention.

As will be realized by those skilled in the art, motors of the type described above normally continue movement in 360° cycles without discrimination from one position to the next. Consequently, it is necessary to employ suitable control structure which will result in the motor moving to any specifically selected position within 360° in order that only the selected image will be projected. It is preferred that the motor not have to step through and project all other images in the seriation until the correct one is found, and that the motor not continue moving on to other images after the selected one has been located and positioned within the projection system.

Stated another way, the present invention employs structure by means of which a motor is directed to move to a certain, distinct position within 360° of rotation, and then to stay in that position until ordered to move to another position. The presently preferred method of accomplishing this is to provide the cartridge with indicia which will indicate to a control system when a certain, preselected position is located at a predetermined point relative to the projection system. For the purposes of discussion in this application, that preselected position will be referred to as the "home" position. In the presently preferred embodiment, every time that the motor is directed to move so as to project a new image, it will automatically increment, at relatively high speed, until the home position is achieved. The motor will continue incrementing in discrete steps until the selected image is located within the projection system by counting off the selected number of steps. For example, the home position might be sensed by an emitter-detector pair actuated by a reflective patch on the surface of the cartridge. The number of increments advanced by the motor is then counted until a number, corresponding to the number representing the desired image, is reached in the count. However, it will be appreciated that the cartridge may be provided with apertures positioned in accordance with the positioning of the images on the cartridge and that the number of apertures may be counted to reach the desired count instead of counting the number of incremental movements of the motor.

As will be apparent from the above discussion, the present invention contemplates the use of any number of cartridges with such a projection device. Each cartridge might be provided, for example, with 100 transparencies or negatives which may be selectively aligned with the projection system so as to be projected onto a projection screen. It will be realized that, in such a case, the mtoor must be controllable through small increments of a predetermined number of degrees.

If it is desired to employ different cartridges at different times with such an apparatus, it will be preferred to provide structure which indicates to the apparatus control system and/or the machine operator exactly which cartridge is mounted on the carrier. If such structure is provided, the control system may be programmed to avoid seeking to project an image which cannot be found on a particular cartridge or to be aware of the fact that the same image might be found in different positions on different cartridges.

In order to accomplish this, it is presently preferred that indicia of some type be employed on the cartridge which can be detected by a sensing means for transmittal to a control system, display board, etc. This indicia and sensing system may be similar to that previously described, i.e., an emitter-detector pair for determining reflectivity or the broken beam passage of light. Alternatively, it might comprise strips of metal or other material which cooperate with sensing bars or "fingers" suitably connected to the control apparatus.

In any event, those skilled in the art will quickly realize, upon perusal of the following Detailed Description, taken together with the accompanying drawings, that the present invention may be employed by any of a wide variety of devices which achieve the desired functions. Many of those devices and structures may not even physically resemble the exemplary embodiment disclosed here, even though they employ the present invention and enjoy its benefits.

DETAILED DESCRIPTION

Figure 1:
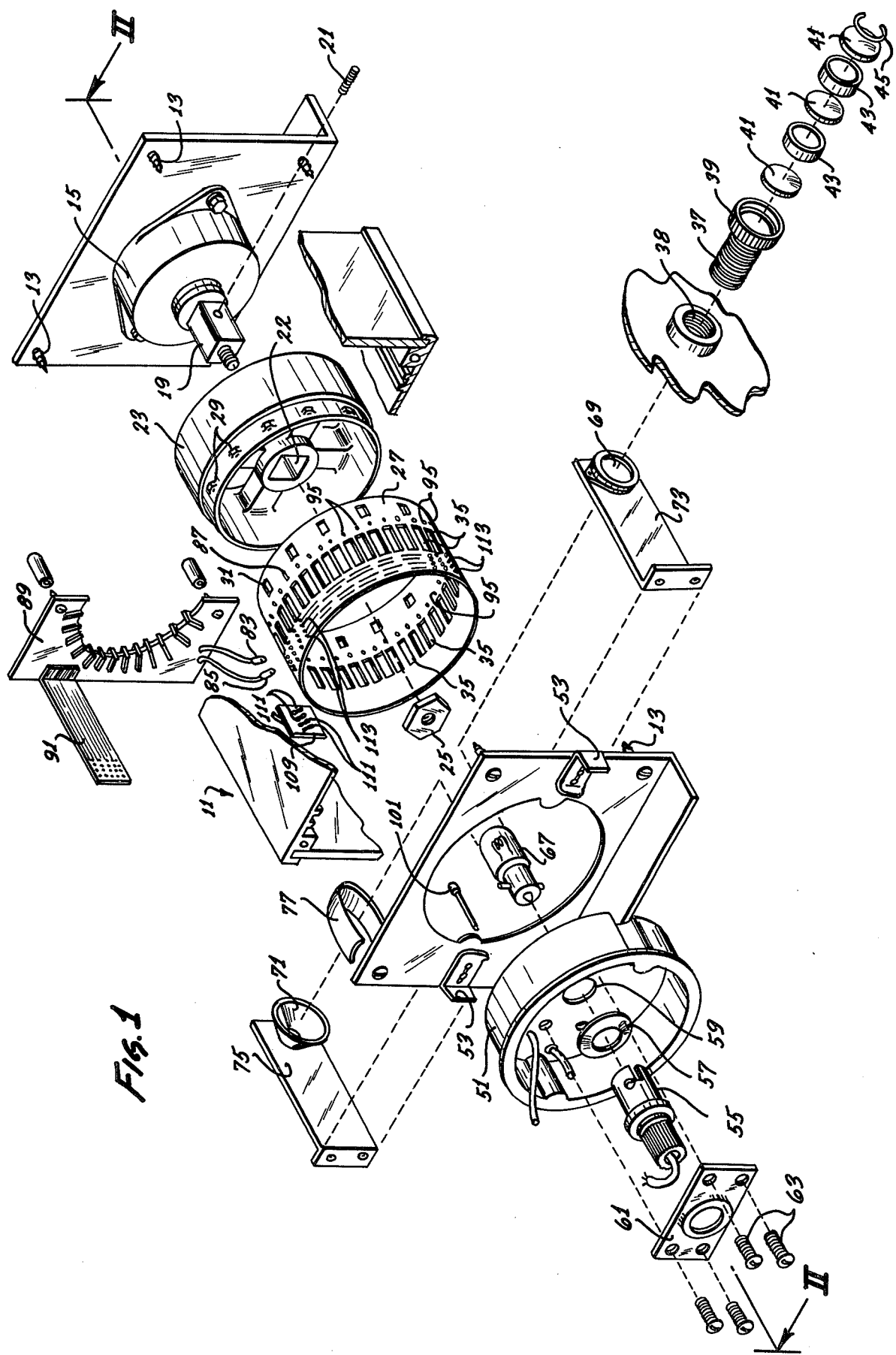
FIG. 1 comprises an exploded perspective view of mechanical apparatus which may be employed in accordance with the present invention.
Figure 2:
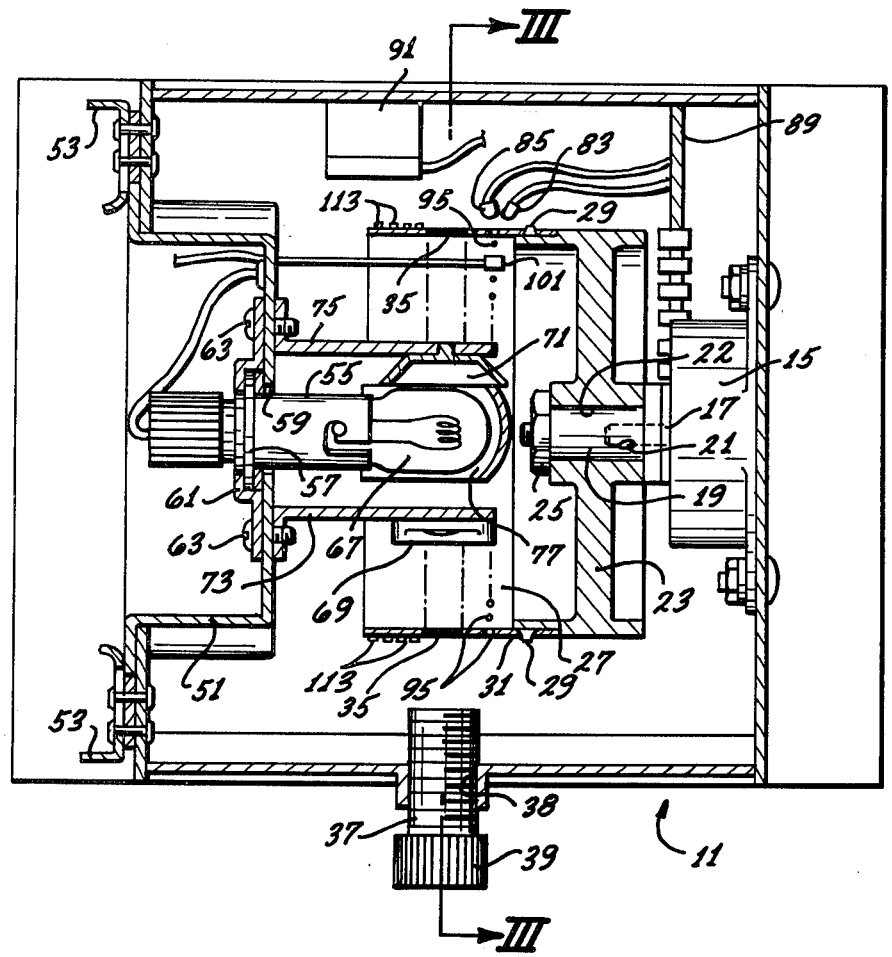
FIG. 2 comprises an axial sectional view of the assembled device shown in FIG. 1, as seen along the line II—II therein.
Figure 3:
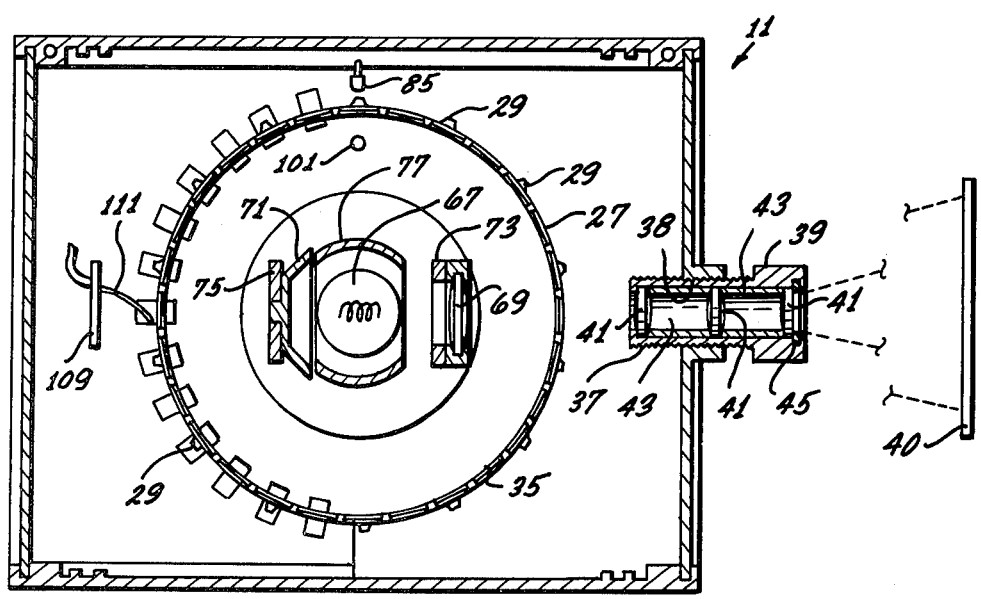
FIG. 3 comprises a sectional view of the device shown in FIG. 1, as seen along a line III—III of FIG. 2.

As shown in FIGS. 1-3, a device formed in accordance with the present invention may include a housing 11, which, if desired, may be formed in a plurality of sections which are joined together by suitable means such as bolts or screws 13. Upon one portion of the housing, a motor 15 may be mounted from which a suitable shaft 17 (FIG. 2) may extend. For the sake of convenience, motor 15 will be described here as a "stepper" motor, but any motor and/or its drive system which can be controlled for incremental rotational movement may be employed. The shaft 17 may support a square or other shaped drive shaft 19, as shown in FIG. 1, which may be fastened to the motor shaft 17 by an suitable means, such as a set screw 21. The drive shaft 19 may be inserted through a complementary bore 22 in the center of a cartridge carrier 23. The shaft 19 and carrier 23 may be fastened together by any suitable means such as a nut 25.

The cartridge carrier 23 is preferably manufactured in such a way as to support a transparency cartridge 27 thereon. Although this may be accomplished in any desired fashion, as shown in the drawings the carrier 23 may employ a plurality of gripping elements 29 which, if desired, may be flexibly depressable to a position even with or radially inside of the periphery of the carrier. Such gripping elements may cooperate with a like number of apertures 31 in the cartridge 27 to hold the cartridge to the carrier for rotation therewith when the motor 15 is actuated. As illustrated in FIG. 1, the cartridge 27 may carry a predetermined number of transparencies 35 located about the periphery thereof for projection onto a viewing screen.

A projection lens tube 37 may be mounted in one wall of the housing 11. If desired, the lens tube may be threaded into a bore 38 in the wall of the housing and be provided with a knurled surface 39 so that an operator can adjust the position of the projection tube to insure the best possible resolution of an image projected onto a viewing screen 40. As shown, the projection tube 37 may include a plurality of lenses 41 maintained at selected distances by spacers 43, all of which may be held within the tube 37 by any suitable means such as a snap ring 45.

The housing 11 may also support an easily removable cap 51 which may be fastened in place by means of a pair of slide fingers 53. The easy removability of the cap 51 will allow an operator to quickly and simply replace the cartridge 27 mounted on the carrier or support 23. If desired, the cap 51 may suitably support a projection lamp socket 55 which may pass through a conical spring washer 57 and a socket bore 59 in the cap 51. The socket 55 may be fastened to the cap by means of a holding plate 61 which, in turn, may be fastened to the cap by means such as bolts 63, thus holding the lamp socket in a fixed position relative to the cartridge.

The mounting of the lamp socket in its position on the cap is, of course, merely exemplary and any similar system may be employed. For example, it may be desired that the socket be adjustable relative to the cap so that a projection lamp 67 may be accurately located relative to a condenser lens pair 69 and a reflector 71. Lenses 69 and reflector 71 may, if desired, be mounted on the cap 51 by means such as brackets 73 and 75. Also, if desired, a lamp shield 77 may be suitably located over the lamp 67 by flexibly gripping the socket 55. Such a shield will prevent light emanating from the lamp from traveling in any direction other than through the condenser lens pair 69, a transparency 35 aligned with the lens, and the projection tube 37.

In this manner, it will be realized that the cartridge 27 will rotate with the carrier or support 23 and stepper motor 15 to position the tranparencies 35 within the projection system including the lamp 67, the condenser lens pair 69, and the projection lens tube 37. Of course, the present invention relates to such a device in which a distinct, preselected transparency 35 is so aligned without requiring such alignment to occur merely as a result of continuous, sequential alignment of all of the transparencies. For this purpose, the present invention requires that some structure be provided for determining a home or starting position for the cartridge and motor, as that term has been previously described.

One such structure might include, for example, a light emitter 83 and a detector 85 which may be positioned to sense light reflected from a small reflective patch 87 on the surface of the cartridge. Of course, the detectable element could be located on carrier 23, if desired. This detector and emitter pair might, for example, be connected to a printed circuit board 89 which may be connected to suitable control apparatus through a connector device 91. With such structure, each time a new image is to be projected onto the screen 41, the control system, including the circuit board 89, can be used to order the motor 15 to rotate at high speed until the home position indicated by the patch 87 is sensed by the emitter-detector pair 83, 85. Subsequently, the motor 15 must then move or step through a number of descrete angular measurements until the proper transparency is aligned with the projection system.

This can be accomplished, for example, by providing a series of apertures 95 about the periphery of the cartridge 27 or carrier 23, each aperture corresponding to one discrete step of the motor. A detector 101 may, if desired, be mounted on the end cap 51 so as to extend into the cartridge to the position illustrated in FIG. 2. Detector 101 and motor 15 may both be connected to control system 89, etc. In this one way, the detector 101 will sense pulses of light as the rays from emitter 83 pass through each consecutive aperture 95. In other words, if the control system 89 orders the motor 15 to align the transparency at the 15th position on the cartridge 27, the motor will turn rapidly until the patch 87 is aligned with the emitter detector pair 83, 85. Then, the motor will move through discrete steps, each step being counted by the emitter-detector pair 83, 101 as light passes through the aperture 95. When 15 steps have thus been counted, motor movement will stop and the proper transparency will have been aligned with the projection system. Of course, depending upon the characteristics of motor 15, this homing and counting may be accomplished very rapidly so that any delay is nearly imperceptible to one viewing the screen 40.

At times, it may be desirable or necessary to provide apparatus which will indicate the identity of the cartridge 27 to the control system and/or to some remote readout structure. This is particularly important when a large number of cartridges or when several cartridges having a large number of transparencies may be employed with the device. Any desired structure may be employed to accomplish this result such as, for example, an emitter-detector pair similar to that employed for either the homing or step counting as described previously.

In order to exemplify another structure which could also be employed for this purpose, however, there has been illustrated a circuit board 109 to which a plurality of flexible sensing fingers 111 may be suitably connected. The board 109 may also be connected to the control system 89, etc. In order that the fingers 111 may sense the identity of the cartridge 27, the latter may be provided with one or more material strips 113 which may be aligned with the fingers 111 when the cartridge is in place on the support or carrier 23. The strips, for example, might be electrically conductive metal strips or may merely be raised beyond the periphery of the cartridge a sufficient distance to cause the fingers 111 to close electric contacts on the board 109.

Fingers 111 may be used to sense the presence of none, one, or several various combinations, or might be used to sense different conductivity characteristics of various strips on one cartridge as compared to other cartridges. In any event, use of this or any similar structure may be employed to present a signal to the control structure so that the latter will not seek to produce an alignment with the projection system of a transparency which may not exist on the cartridge presently in the machine. Further, the structure may be used to reveal a programmed control structure that the desired transparency is located at a certain step on the mounted cartridge, although it may be in a different step on another cartridge.

Thus, those skilled in the art will now realize that a device embodying the present invention may employ a wide variety of structures which may be utilized to control the precise position on a cartridge mounted for rotation by a stepper motor, such cartridge being used, for example, to align a transparency with the projection system. Use of a device in the nature of that described does not require that the cartridge be positioned on its carrier in some critical relationship therewith if the detectable elements are on the cartridge rather than the carrier. The homing system may be utilized to bring the cartridge to the home position regardless of the location in which the homing indicator, such as reflective patch 87, is initially mounted relative to the carrier.

Figure 4:
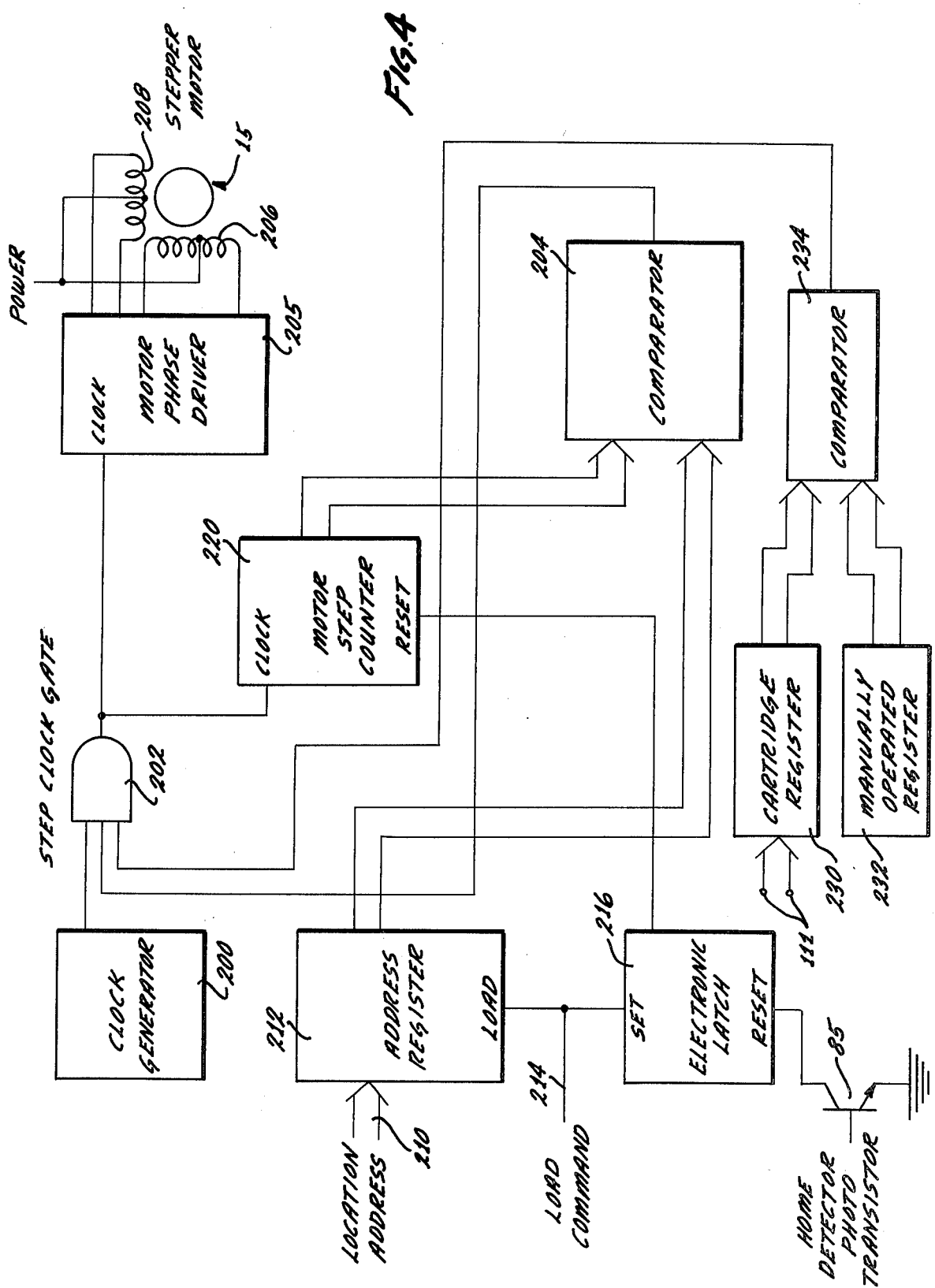
FIG. 4 is a schematic block diagram of electrical circuitry for controlling the operation of the mechanical apparatus shown in FIGS. 1, 2 and 3.

The electrical system for controlling the operation of the mechanical apparatus shown in FIGS. 1, 2 and 3 and described above is illustrated on a block diagram basis in FIG. 4. The electrical system includes a clock generator 200 which generates clock signals at a particular frequency. The clock signals from the generator 200 are introduced to an "AND" gate 202, as is the output from a comparator 204, which may be constructed in a conventional manner. The output from the "AND" gate 202 is in turn introduced to a phase driver 205 which provides signals to windings 206 and 208 in the stepper motor 15 (also shown in FIG. 1).

The signals representing a location address are produced on lines 210 and may be in binary form. Although two lines are shown in FIG. 4 to provide the location address, it will be appreciated that a multiple number of lines may be provided, particularly when the address is in binary form. The signals on lines 210 pass to an address register 212, which may be constructed in a conventional manner. A "load command" signal 214 is also introduced to the address register 212. The output signals from the address register 212 pass to input terminals of the comparator 204.

An electronic latch 216, such as a bistable flip-flop, also receives signals at one input terminal from the load command line 214. The latch 216 also receives signals at a second input terminal from the collector of a phototransistor 85 (also shown in FIG. 1), the emitter of which may be grounded. The signals on one output terminal of the latch 214 are introduced to a reset terminal in a counter 220 having another input terminal connected to the output of the "AND" network 202. Output signals are introduced on a plurality of lines from the counter 220 to input terminals of the comparator 204. The counter 220 may be constructed in a conventional manner.

When a particular tranparency is to be selected on a cartridge disposed on the carrier 23 (FIG. 1), the signals representing the address of this transparency are introduced to the address register 212. When a "load command" signal is introduced on the line 214, the signals representing the address of the transparency become stored in the address register 212. The address register in turn introduces these signals to the comparator 204 for comparison in the comparator with the signals from the counter 220.

When the comparator 204 indicates that the count in the counter 220 does not correspond to the number preset into the register 212, it introduces a signal to the "AND" gate 202 to activate the "AND" gate. This causes the clock signals from the generator 200 to pass through the "AND" gate 202 to the phase driver 205. These signals cause the stepper motor to operate so that the rotor in the motor steps through successive increments upon the introduction of progressive clock signals from the generator 200.

The load command signal provided on the line 214 also causes the latch 216 (or flip-flop) to be triggered to the set state and causes a signal of a particular amplitude to be introduced from the latch 216 to the counter 220. This signal causes the counter 220 to be reset upon each introduction of a clock signal to the counter 220 from the "AND" gate 202. In this way, the counter 220 is reset to "zero" upon each passage of a clock signal through the gate 202. This prevents the count in the counter 220 from corresponding with the number preset into the register 212. As a result, signals continue to pass through the "AND" gate 202 to the windings 206 and 208 in the stepper motor 15 until the patch 87 (FIG. 1) is aligned with the emitter-detector pair 83 and 85.

Upon the alignment of the patch 87 with the emitter-detector pair 83 and 85, the photo transistor 85 becomes conductive. This causes the latch 216 (or flip-flop) to become triggered to the reset states. As a result, a signal is no longer introduced from the latch 216 to the counter 220 to reset the counter. Thereafter, the clock signals passing through the "AND" gate 202 cause the count in the counter 220 to become progressively increased.

When the count in the counter 220 corresponds to the number preset into the address register 212, an output signal is produced by the comparator 204. This output signal closes the "AND" gate 202 and thereby prevents any further clock signals from passing through the "AND" gate. In this way, the stepper motor 15 steps the cartridge to the transparency represented by the number preset into the address register 212. When this transparency is reached, the "AND" gate 202 becomes closed so that the stepper motor 15 cannot be further energized.

Means may also be included in FIG. 4 for identifying the particular cartridge to make certain that it is the one which is desired to be processed. For example, a register 230 may be included to identify in digital form the cartridge indicated by the pattern of signals from the sensing fingers 111. A register 232 may also be provided for identifying in digital form the cartridge manually selected on the basis that it contains the desired information.

The signals from the registers 230 and 232 are introduced to a comparator 234 which is constructed in a manner similar to the comparator 204. The comparator produces an output signal when the patterns of signals from the registers 230 and 232 are identical. The signal from the comparator 234 is introduced to the "AND" network 202 so that the "AND" network will be activated only when the desired cartridge is being processed.

The present invention thus provides an alignment and indication system which is rapid in operation, inexpensive to produce, and very simple and non-complex for construction and maintenance. Its features may be employed in a wide variety of structures which may not physically resemble that described here but which, nevertheless, employ the present invention as set forth in the following claims.

I claim:

1. In combination in a projection apparatus, a cartridge having a plurality of transparencies arranged in a continuous sequence on the cartridge and having means defining a starting position, a housing, stepper motor means mounted on said housing, means mounted on said housing for rotation by said stepper motor including cartridge carrier means operably connected to said motor for carrying the cartridge for rotation with the stepper motor means, means in said housing for providing a projection light source to illuminate individual ones of said transparencies on the cartridge, means on said housing for focusing light from said source onto individual ones of said transparencies, means on said housing for defining a viewing screen, means on said housing for projecting the image formed by the illumination of individual ones of said transparencies on the viewing screen, means for initially providing an operation of the motor means to move the cartridge to the starting position, means for producing a control signal indicating the movement of the cartridge to the starting position, means responsive to the production of the control signal for continuing the operation of the motor means on an incremental basis from the starting position, means responsive to the operation of the motor means on an incremental basis from the starting position for subsequently discontinuing the operation of the motor means on the incremental basis when the cartridge has moved to a position providing for a projection of a selective one of the transparencies on the viewing screen, means included on the cartridge for identifying the cartridge, means disposed in the housing in cooperative relationship with the cartridge identifying means for determining the identity of the cartridge, and means for controlling the operation of the motor means in accordance with the identity of the cartridge.

2. The apparatus of claim 1 wherein means are disposed on the housing for producing an energy signal and means are disposed relative to the energy signal means and the starting position on the cartridge for producing the control signal when the cartridge has moved to the starting position and wherein means are provided for obtaining a movement of the cartridge by the stepper motor means to the starting position and thereafter on a continued movement to the selective one of the transparencies.

3. The apparatus of claim 1 wherein the identifying means on the cartridge constitutes a plurality of digital indications in an individual pattern for each cartridge wherein said identity-determining means comprises a plurality of sensing devices each responsive to an individual one of the digital indications to produce signals representative of such indications and further comprises means responsive to such signals for controlling the operation of each stepper motor means in accordance with the pattern of such signals.

4. Apparatus for projection of a specific image selected from a seriation of transparencies comprising a projection system including
means for illuminating a transparency,
means for focusing the image of a transparency illuminated by such illuminating means, and
means onto which the image of an illuminated transparency may be focused,
means for supporting a plurality of transparencies for selective alignment with said projection system,
means movable in incremental steps for actuation of said supporting means to align a selected transparency with said projection system,
means operatively connected to said actuation means for controlling said actuation means to cause said supporting means to move to a home position each time a different transparency is to be aligned with said projection system,
said controlling means including
means disposed relative to said support means for providing a home indication signal,
means disposed relative to said support means for detecting the signal from the home indication means when the support means has moved to the home position,
means providing a movement of the movable means to the homing position, and
means for continuing the movement of the movable means on an incremental basis for the homing position to the position aligning the selected transparency with the projection system.

5. The apparatus of claim 4 including
means for determining the number of incremental steps through which said actuation means is moved after the home position of said support means is attained by said actuation means.

6. Apparatus for projection of a specific image selected from a seriation of transparencies comprising a projection system including
means for illuminating a transparency,
means for focusing the image of a transparency illuminated by such illuminating means, and
means onto which the image of an illuminated transparency may be focused,
means for supporting a plurality of transparencies for selective alignment with said projection system,
means movable in incremental steps for actuation of said supporting means to align a selected transparency with said projection system, and
means operatively connected to said actuation means for controlling said actuation means to cause said supporting means to move to a home position each time a different transparency is to be aligned with said projection system,
said controlling means including
means disposed relative to said support means for providing an incremental step indication signal in accordance with the incremental movement of said actuation means, and
means disposed relative to said supporting means for detecting the incremental step indication signal to align the selected transparency with the projection system when a particular count has occurred.

7. The apparatus of claim 6 including
means operatively connected to said controlling means for identifying the particular seriation of transparencies supported by said supporting means.

8. The apparatus of claim 7 including
means operatively associated with said supporting means for providing an identification signal to said identifying means.

9. A projection apparatus including
motor means for operatively positioning a selected one of a series of transparencies within a projection system,
cartridge means movably carried by the motor means and having a plurality of transparencies thereon,
a projection system operatively positioned relative to said motor means for projection by the projection system of an image from the transparencies on the cartridge means,
means for actuating said motor means to locate a selected transparency on the cartridge means within said projection system,
said cartridge means further including means cooperative with said actuating means for indicating the identity of said cartridge means,
means responsive to the identification of a particular cartridge means for obtaining the operation of the actuation means,
means operatively coupled to the actuation means for initially obtaining the movement of the cartridge means to a starting position, and
means responsive to the movement of the cartridge means to the starting position for continuing the operation of the actuation means in moving the cartridge means until the selected transparency on the cartridge means has been located within the projection system.

10. A projection apparatus for use with a cartridge having a plurality of transparencies disposed at successive positions along the cartridge with each transparency having an individual image and with the cartridge defining a starting position and with each transparency having a coded identification, including a screen for displaying visual images,
a projection system for projection of the images from the transparencies onto the screen,
stepper motor means for operatively positioning successive transparencies in the plurality within the projection system,
means for initially operating the stepper motor means to move the cartridge to the starting position,
means responsive to the movement of the cartridge to the starting position for producing a control signal,
means responsive to the coded identifications on the individual transparencies for identifying each individual transparency in accordance with such code,
means for providing for a selection of an individual one of the transparencies in accordance with the coded identification of such individual transparency,
means for comparing the coded identification on the preselected transparency with the coded identification of the transparency whose image is being projected onto the screen, and means responsive to the production of the control signal for continuing the movement of the stepper motor means on an incremental basis until an identity in the comparison of the coded identifications of the preselected transparency and the transparency whose image is being projected onto the screen.

11. In combination, motor means having an incremental operation, reproduction means, cartridge means driven by said motor means and having a series of articles thereon for individual alignment of said articles with said reproduction means and having a representation of a starting position, means for controlling the incremental operation of said motor means, means for energizing said controlling means to drive said motor means to the home position on the cartridge means whenever an article of said series of articles is to be aligned with said reproduction means, means responsive to the movement of the motor means to the home position on the cartridge means for thereafter continuing the movement of the motor means on an incremental basis, detecting means for locating individual ones of the articles in the plurality on the cartridge means, means for deenergizing the controlling means to stop the incremental operation of the motor means at a selected one of the articles when the preselected one of the articles has been detected by the detecting means.

12. In combination in a projection apparatus, a cartridge having a plurality of transparencies arranged in a continuous sequence on the cartridge and having means defining a starting position, a housing, stepper motor means mounted on said housing, means mounted on said housing for rotation by said stepper motor including cartridge carrier means operably connected to said motor for carrying the cartridge for rotation with the stepper motor means, means in said housing for providing a projection light source to illuminate individual ones of said transparencies on the cartridge, means on said housing for focusing light from said source onto individual ones of said transparencies, means on said housing for defining a viewing screen, means on said housing for projecting the image formed by the illumination of individual ones of said transparencies on the viewing screen, means for initially providing an operation of the motor means to move the cartridge to the starting position, means for producing a control signal indicating the movement of the cartridge to the starting position, means responsive to the production of the control means responsive to the operation of the motor means on an incremental basis from the starting position for subsequently discontinuing the operation of the motor means on the incremental basis when the cartridge has moved to a position providing for a projection of a selective one of the transparencies on the viewing screen, and said means for locating the home position of the stepper motor means comprising a light emitter for directing light to the means defining the starting position on the cartridge and a light detector for receiving light from the means defining the starting position on the cartridge.

13. In combination in a projection apparatus, a cartridge having a plurality of transparencies arranged in a continuous sequence on the cartridge and having means defining a starting position, a housing, stepper motor means mounted on said housing, means mounted on said housing for rotation by said stepper motor including cartridge carrier means operably connected to said motor for carrying the cartridge for rotation with the stepper motor means, means in said housing for providing a projection light source to illuminate individual ones of said transparencies on the cartridge, means on said housing for focusing light from said source onto individual ones of said transparencies, means on said housing for defining a viewing screen, means on said housing for projecting the image formed by the illumination of individual ones of said transparencies on the viewing screen, means for initially providing an operation of the motor means to move the cartridge to the starting position, means for producing a control signal indicating the movement of the cartridge to the starting position, means responsive to the production of the control signal for continuing the operation of the motor means on an incremental basis from the starting position, means responsive to the operation of the motor means on an incremental basis from the starting position for subsequently discontinuing the operation of the motor means on the incremental basis when the cartridge has moved to a position providing for a projection of a selective one of the transparencies on the viewing screen, means on the cartridge in a coded form for identifying the cartridge being projected on the viewing screen, means for obtaining a preselection of a particular one of the cartridges, means disposed in said housing in cooperative relationship with said cartridge identifying means for determining the identity of each cartridge, and means for controlling the operation of said motor means in accordance with the comparison between the identity of each cartridge being projected on the viewing screen and the preselected cartridge to discontinue the operation of the motor when the preselected one of the cartridges has been identified.

14. The apparatus of claim 13 including means operatively associated with said supporting means for providing an identification signal to said identifying means.

15. Apparatus for projection of a specific image selected from a seriation of transparencies comprising a projection system including means for illuminating a transparency, means for focusing the image of a transparency illuminated by such illuminating means, and means onto which the image of an illuminated transparency may be focused, means for supporting a plurality of transparencies for selective alignment with said projection system, means movable in incremental steps for actuation of said supporting means to align a selected transparency with said projection system, means operatively connected to said actuation means for controlling said actuation means to cause said support means to move to a home position each time a different transparency is to be aligned with said projection system, said controlling means including means disposed relative to said support means for providing a home indication signal, means disposed relative to said support means for detecting the signal from the home indication means when the support means has moved to the home position, and said controlling means further including means for detecting a signal from an incremental step indication means operatively located relative to said supporting means, and means operatively positionable relative to said support means for providing a sensible incremental step indication signal to said step signal detecting means.

16. Apparatus for projection of a specific image selected from a seriation of transparencies comprising a projection system including means for illuminating a transparency, means for focusing the image of a transparency illuminated by such illuminating means, and means onto which the image of an illuminated transparency may be focused, means for supporting a plurality of transparencies for selective alignment with said projection system, means movable in incremental steps for actuation of said supporting means to align a selected transparency with said projection system, means operatively connected to said actuation means for controlling said actuation means to cause said supporting means to move to a home position each time a different transparency is to be aligned with said projection system, said controlling means including means disposed relative to said support means for providing a home indication signal, means disposed relative to said support means for detecting the signal from the home indication means when the support means has moved to the home position, and means operatively connected to said controlling means for identifying the particular seriation of transparencies supported by said supporting means.

17. The apparatus of claim 16 wherein said controlling means includes means disposed relative to said support means for providing a sensible home indication signal and means disposed relative to the support means for detecting the signal from the home indication means when the support means has moved to the home indication position.

18. The apparatus of claim 16 wherein said motor means constitutes a stepper motor incrementally movable in accordance with the operation of said actuation means.

19. Apparatus for projection of a specific image selected from a seriation of transparencies comprising a projection system including means for illuminating a transparency, means for focusing the image of a transparency illuminated by such illuminating means, and means onto which the image of an illuminated transparency may be focused, means for supporting a plurality of transparencies for selective alignment with said projection system, means movable in incremental steps for actuation of said supporting means to align a selected transparency with said projection system, means operatively connected to said actuation means for controlling said actuation means to cause said supporting means to move to a home position each time a different transparency is to be aligned with said projection system, said controlling means including means disposed relative to said support means for providing a home indication signal, means disposed relative to said support means for detecting the signal from the home indication means when the support means has moved to the home position, and cartridge means mounted on said support means and having a plurality of transparencies mounted thereon, a home position indication means located thereon, an incremental step indication means thereon, and a cartridge identity indication means thereon, and said controlling means including means for detecting the location of said home position indication means and for detecting said incremental step indication means.

20. A projection apparatus including motor means for operatively positioning a selected one of a series of transparencies within a projection system, cartridge means movably carried by the motor means and having a plurality of transparencies thereon, a projection system operatively positioned relative to said motor means for projection of an image from the transparencies on the cartridge means, means for actuating said motor means to locate a selected transparency on the cartridge means within said projection system, said cartridge means further including means cooperative with said actuating means for indicating the identity of said cartridge means, means responsive to the identification of a particular cartridge means for obtaining the operation of the actuation means, detecting means for locating individual ones of the transparencies in the plurality on the cartridge means, means cooperative with said detecting means for indicating a home position of said cartridge relative thereto, and means responsive to the actuation of said actuation means for initially obtaining a movement of the cartridge means to the home position and for subsequently obtaining a continued movement of the cartridge means to locate the selected transparency on the cartridge means within the projection system.

21. The apparatus of claim 20 wherein
said cartridge means further includes
means cooperative with said detecting means for indicating the movement of said cartridge means in incremental steps from the home position thereof.

22. A projection apparatus including
motor means for operatively positioning a selected one of a series of transparencies within a projection system,
cartridge means movably carried by the motor means and having a plurality of transparencies thereon,
a projection system operatively positioned relative to said motor means for projection of an image from the transparencies on the cartridge means,
means for actuating said motor means to locate a selected transparency on the cartridge means within said projection system,
said cartridge means further including means cooperative with said actuating means for indicating the identity of said cartridge means,
means responsive to the identification of a particular cartridge means for obtaining the operation of the actuation means,
means cooperative with said detecting means and said cartridge means for indicating the movement of said cartridge means in incremental steps, and
means responsive to the movement of said cartridge means to the position locating the selected transparency on the cartridge means within the projection system for discontinuing the operation of the actuation means.

23. Apparatus for projection of a specific image selected from a seriation of transparencies comprising projection system including
means for illuminating a transparency,
means for focusing the image of a transparency illuminated by such illuminating means, and
means onto which the image of an illuminated transparency may be focused,
means for supporting a plurality of transparencies for selective alignment with said projection system,
means movable in incremental steps for actuation of said supporting means to align a selected transparency with said projection system, and
means operatively connected to said actuation means for controlling said actuation means to cause said supporting means to move to a home position each time a different transparency is to be aligned with said projection system, said controlling means including
means disposed relative to said support means for providing a home indication signal, and
means disposed relative to said support means for detecting the signal from the home indication means when the support means has moved to the home position, also including
cartridge means mounted on said support means and having
a plurality of transparencies mounted thereon,
a home position indication means located thereon,
an incremental step indication means thereon, and
a cartridge identity indication means thereon, and
said controlling means includes
means for detecting the location of said home position indication means and for detecting said incremental step indicating means, wherein
said controlling means further includes
means for detecting identity indication means.

* * * * *